United States Patent
Hoffmann

[15] 3,646,547
[45] Feb. 29, 1972

[54] ANALOG-TO-DIGITAL CONVERTER FOR POSITIONAL COORDINATES

[72] Inventor: Norbert H. Hoffmann, Royal Oak, Mich.

[73] Assignees: Albert J. Beni, Utica; Charles A. Bourdo; W. Keith Galbraith, Pontiac, Mich., part interest to each

[22] Filed: July 2, 1969

[21] Appl. No.: 838,421

[52] U.S. Cl. ............... 340/347 SY, 335/151.11, 318/20.160
[51] Int. Cl. ....................................................... H03k 13/02
[58] Field of Search ........................... 340/347; 235/151.11; 318/20.160

[56] References Cited

UNITED STATES PATENTS

| | | | |
|---|---|---|---|
| 3,478,347 | 11/1969 | Hewlett | 340/347 |
| 3,457,484 | 7/1969 | Shimizu | 318/20.160 |
| 3,449,742 | 6/1969 | Stapleton | 340/146.3 AE |
| 3,467,899 | 9/1969 | Inaba | 318/20.160 |
| 3,259,819 | 7/1966 | Heiser | 318/20.160 |
| 3,091,755 | 5/1963 | Sanner | 340/347 |

Primary Examiner—Maynard R. Wilbur
Assistant Examiner—Jeremiah Glassman
Attorney—Barnard, McGlynn & Reising

[57] ABSTRACT

Method and apparatus are disclosed for converting an analog representation of a line into digital form. The invention is especially useful in connection with preparing control programs for numerically controlled machine tools. A scanner is oriented in the direction of the line and first and second pulse trains are generated having pulse repetition rates corresponding respectively to the cosine and to the sine of the direction angle of the scanner. The scanner is displaced with simultaneous components of stepwise motion along first and second axes in synchronism with the pulses corresponding respectively to the cosine and the sine of the direction angle and the scanner is continuously maintained in alignment with the direction of the line so that the system provides for self-checking of the accuracy of the digital data generated. The digital data is recorded on a suitable medium for subsequent playback to control a numerically controlled machine tool.

4 Claims, 5 Drawing Figures

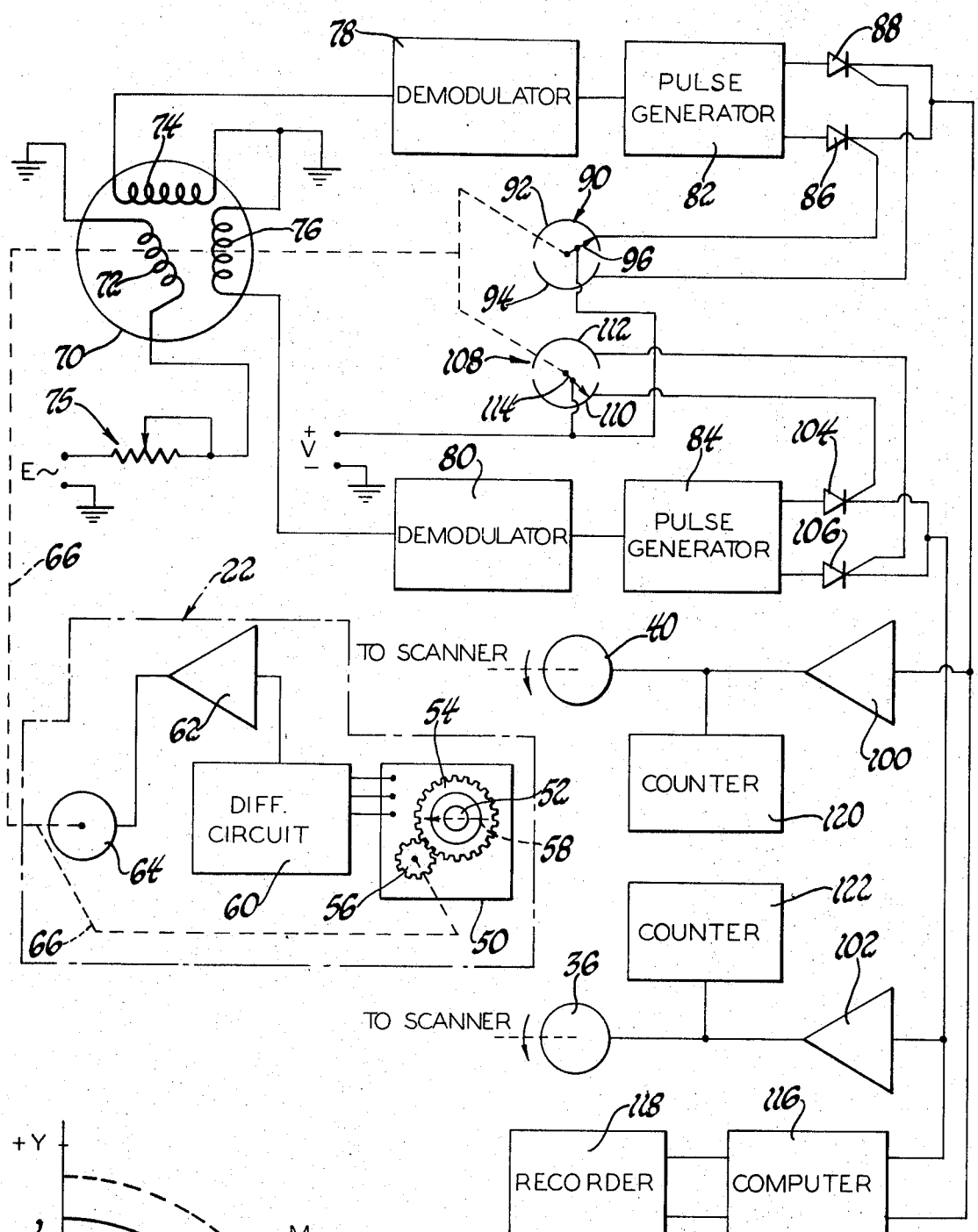
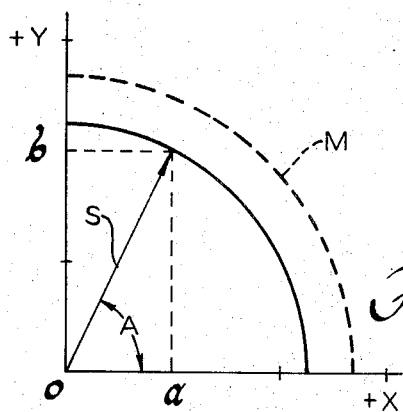
Fig. 4
Fig. 5
INVENTOR.
Norbert H. Hoffmann
BY
Barnard, McGlynn & Reising
ATTORNEYS

ANALOG-TO-DIGITAL CONVERTER FOR POSITIONAL COORDINATES

This invention relates to systems for automatically controlling the position or attitude of an object; more particularly, the invention relates to a system for converting position or direction information from analog to digital form.

In many applications of automatic control systems, it is desired to utilize a control signal in digital form. For such purposes it is often necessary to convert an analog representation of positional coordinates into a digital representation thereof. A particular application for which this invention is especially adapted is numerical control of machine tools. In this application the analog information is represented by a drawing, template or model and the process of converting the analog representation of positional coordinates into digital form is referred to as digitizing.

Although numerically controlled machine tools are presently in widespread use, there is a continuing problem of producing, in an efficient and economical manner, the recorded program necessary for the operation thereof. Digitizing is an essential part of this program preparation and several systems have been developed in the prior art for digitizing the analog data for use in either point-to-point or continuous path type numerically controlled machine tools. These systems are characterized by the requirement for time-consuming operations by human operators, by exceedingly elaborate and costly equipment or by the lack of speed or reliability. One prior art system for digitizing contour data utilizes a scanner with a resolver which resolves the direction angle of the contour line into variable sine and cosine components. These components are utilized as the X-axis and Y-axis coordinate signals for a closed-loop DC servo operatively connected with the scanner, i.e., to produce relative displacement between the sensing probe and the contour line. This displacement of the scanner along the respective X- and Y-axes is utilized to operate X- and Y-axis pulse generators in the form of electromechanical or electro-optical digital transmitters. The digital outputs of these transmitters represent the X- and Y-axis positional coordinates of the points on the contour line being scanned. These X- and Y-axis digital signals are suitably recorded for use in the program for the numerically controlled machine tool to produce the workpieces represented by the analog information. The disadvantage of this prior art system resides largely in the very high cost of the electrical system including the DC servo and digital transmitters for producing the digital data with the requisite reliability and accuracy.

Another prior art system which has been proposed for converting analog information from a drawing to digital form for use with a numerically controlled machine tool also utilizes a resolver arrangement which controls X- and Y-axis pulse generators having output frequencies corresponding to the X- and Y-components of the input angle to the resolver. In this arrangement the input information corresponding to the dimensions and angles of the part is supplied by manually operated dials. This system does not utilize a scanner and, accordingly, there is no self-checking or verification of the digital information resulting from the conversion.

It is a general object of this invention to provide an improved method and apparatus for converting an analog representation of positional coordinates into digital form.

Another object of this invention is to provide a scanning and digitizing system especially adapted for use in connection with numerically controlled machine tools which is relatively inexpensive and of simple construction and operation.

Another object of the invention is to provide a scanning and digitizing system which is self-checking in its operation so that the digital data produced thereby for commitment to a recording medium is verified for accuracy at the time it is produced.

An additional object of the invention is to eliminate the need for an analog-type servosystem with separate digital transmitters by means of a simplified system which directly converts the analog information to digital information.

Another object of the invention is to provide an analog-to-digital converter which is capable of an exceedingly high degree of resolution of positional coordinates in digital form without the need for complex or precision components.

An additional object of the invention is to provide a digitizer utilizing an electronic resolver with pulse generators responsive thereto which develop positional coordinates in digital form and which may be utilized to energize servomotors for the scanner to close the loop and provide for self-checking of the digital data.

An additional object of the invention is to provide a digitizer which converts analog position and attitude information into digital form by resolver controlled pulse generators wherein positional coordinates are at any time represented by the cumulative net pulse count for the corresponding axis and the attitude or direction angle is represented at any time by the relative values of the pulse repetition rates of the respective coordinate axes.

In accordance with this invention, an analog representation of a line or path in at least one plane is converted into digital form by orienting a scanner in the direction of the line, generating first and second pulse trains having repetition rates corresponding to the cosine and to the sine, respectively, of the direction angle of the scanner, displacing the scanner stepwise with components of motion along an X-axis and a Y-axis in synchronism with the pulses corresponding respectively to the cosine and sine of the direction angle, and maintaining the scanner oriented with a direction angle corresponding to the direction of said line. Thus, the position of the point being scanned and the direction of the line at that point corresponds to the number and rate of pulses corresponding to the X-axis and Y-axis. A recorded representation of said pulses therefore represents in digital form the positional coordinates of the points on the line and may be utilized directly in the program for a numerically controlled machine tool. The invention is implemented by use of scanner adapted for displacement in at least one plane with components along an X-axis and Y-axis and connected with a resolver for supplying a direction angle input signal thereto corresponding to the direction angle of the line at any point thereon. An X-axis and Y-axis pulse generator are connected respectively with the cosine and sine outputs of the resolver and are adapted to produce respective output pulse trains having repetition rates corresponding to the resolver output signals. An X-axis pulse-stepping motor and a Y-axis pulse-stepping motor are connected respectively with the X-axis and Y-axis pulse generators and are responsive to the output pulses thereof to produce a displacement corresponding to the number of pulses. The stepping motors are connected with the scanning means for displacement thereof in a direction corresponding to the direction angle, and coordinates of successive points on the line are represented by the number of pulses produced by the pulse generator, and the accuracy of the positional coordinates in digital form is verified by the displacement of the scanning means to the successive points on the line.

The manner in which the objects mentioned above and others are achieved in accordance with this invention will become apparent from the detailed description which follows taken with the accompanying drawings in which:

FIG. 4 is a diagrammatic representation of a scanner and digitizer system of the present invention; and FIG. 5 is a graphical representation of certain control signal quantities developed in the system of FIG. 4.

Figure 1:
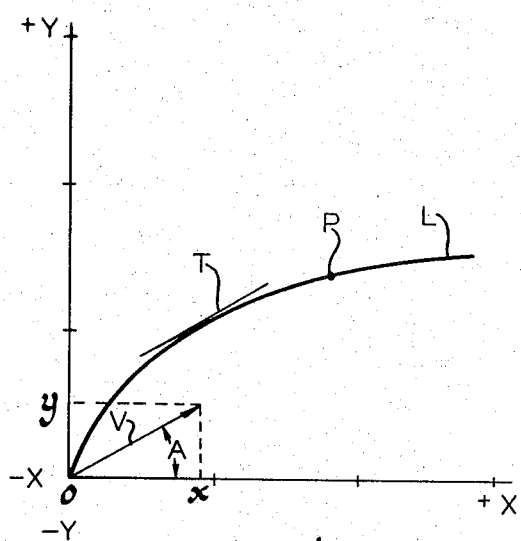
FIG. 1 represents a coordinate system and line used for explanatory purposes.

Referring now to the drawings, there is shown an illustrative embodiment of the invention of a system for converting an analog representation of positional coordinates to a digital representation for use in a numerically controlled machine tool. Such an analog representation, as is well known, may be in the form of a drawing, template or a model of a workpiece to be machined. It is desired, therefore, to produce in recorded form, such as on magnetic or punched tape, a program including digitized positional coordinates of points on the surface of the workpiece and which when played back provides the necessary control signals for a numerically controlled machine tool to cause a cutting tool to operate on a workpiece and produce a surface configuration corresponding to the analog representation, i.e., the drawings, template or the workpiece model.

Referring first to FIG. 1, there is illustrated a path or a line L of arbitrary curvature and extending from the origin O of X- and Y-axes in a rectangular coordinate system. For illustrative purposes, the line L is shown in the first quadrant with the positive direction of the X-axis extending to the right and the positive direction of the Y-axis extending upward but, of course, the line may also extend into the other three quadrants of the coordinate system. It is noted that at any point on the line L, the line has the direction of the tangent line T. A unit vector V from the origin O extending parallel to the tangent line T has a direction angle A measured from the positive X-axis. The direction angle A is the angle whose tangent is $y/x$ and the coordinate $x$ is equal to the cosine of A, and the coordinate $y$ is equal to the sine of A. Obviously then, any direction angle in any of the four quadrants of the coordinate system can be defined by the value of sine and the cosine of the angle A, i.e., the direction angle of the line at any point. For explanatory purposes, assume that the direction angle of the line L remains constant for an incrementally small distance from the origin O. If a point-probe is displaced from the origin O with a displacement component along the X-axis proportional to the cosine of the angle A and with a displacement component along the Y-axis proportional to the sine of the angle A, the path of the probe will coincide with the line L over the incremental distance. However, the curved line L has a continuously changing direction angle A and can be considered to have a direction angle which remains constant only for infinitesmally small increments of distance. Consequently, when the probe is displaced from the origin O to a point P on the line the direction angle A is continuously changing and the relative values of the components of motion along the respective X- and Y-axes continuously change in accordance with the values of the cosine and sine of the direction angle, and the path traced by the probe continuously coincides with the line.

Figure 2:
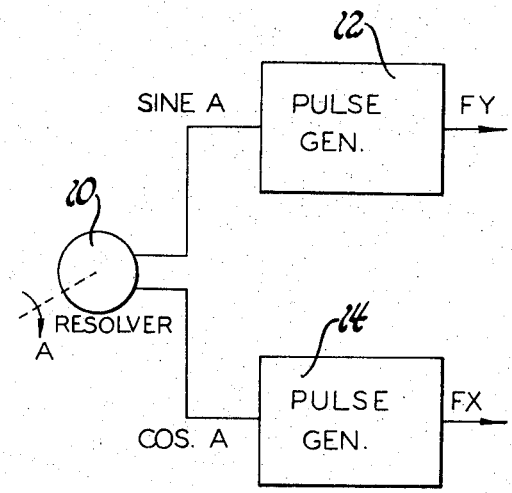
FIG. 2 shows an elementary system as an aid to explanation of the present invention.

In FIG. 2 there is illustrated an elementary system for converting the analog direction angle information into digital form. This system comprises a resolver 10 suitably of the electromechanical type with an input shaft adapted to be displaced from a reference position through an angle A. The resolver produces a first output signal corresponding to the sine of A and a second output signal corresponding to the cosine of A. The first output signal is applied to the input of a pulse generator 12 which is adapted to produce an output pulse train which has a pulse repetition rate FY corresponding to the input signal, i.e., the sine of A. The second output signal is applied to the input of a pulse generator 14 which is adapted to produce an output pulse train having a repetition rate FX which is proportional to the cosine of A. When the resolver shaft is displaced in accordance with the direction angle A of the line L at any point, the direction of the line at that point will be represented by the ratio of the pulse repetition rate FY to the repetition rate FX. Furthermore, if a probe is displaced stepwise along the Y-axis in synchronism with the pulses of pulse generator 12 and simultaneously along the X-axis in synchronism with the pulses of pulse generator 14, the probe will trace a path corresponding to the line L. Positional coordinate information in digital form is thus represented by the output signals FX and FY of the pulse generators 12 and 14. The net count of the pulses in the signal FX represents the X-coordinate of a point P and net count of the pulses in the signal FY represents the Y-coordinate of the point P.

Figure 3:
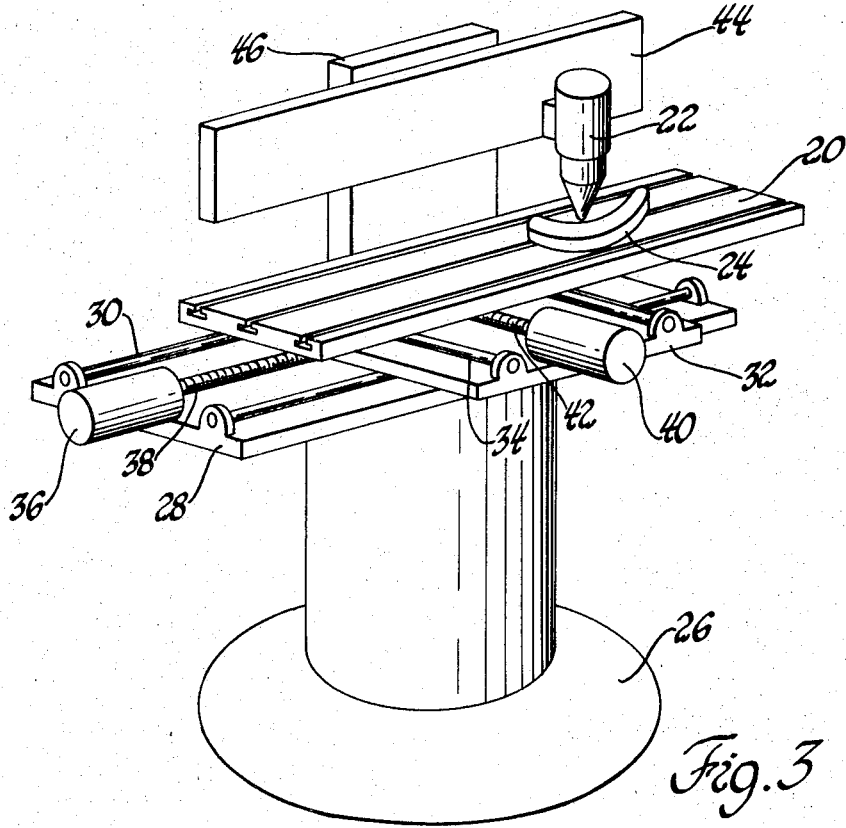
FIG. 3 is a diagrammatic representation of a typical scanner.

Referring now to FIGS. 3 and 4, the invention will be described with reference to a particular embodiment for use in generating and recording digital data for numerically controlled machine tools. For purposes of simplicity, the description will be given with reference to a two-axis system, i.e., where the line or contour to be digitized lies in a single plane. However, it will be apparent as the description proceeds that the invention is equally applicable to other multiaxes systems.

The system includes a scanner, as illustrated in FIG. 3, which comprises a tracer 22 and a numerical positioning table having a movable table 20. The movable table is adapted to receive a workpiece template or model 24 which constitutes the analog representation of positional coordinates of a line on the surface of a workpiece which is to be represented in digital form. The movable table 20 is supported by a machine base 26 upon which is mounted a support member 28 having ways 30 extending in a direction which defines the Y-axis of the scanner. A movable support member 32 is slidably mounted on the ways 30 for displacement in the direction of the Y-axis and is provided with ways 34 which extend in the direction defining the X-axis of the scanner. The movable table 20 is slidably mounted on the ways 34. A stepping motor 36 is mounted upon the support member 28 and has an output shaft which drives a lead screw 38 which operatively engages the support member 32 and produces translatory movement thereof in accordance with the rotational displacement of the motor 36. A pulse stepping motor 40 is mounted upon the support member 32 and has an output shaft which drives a lead screw 42 which is operatively engaged with the movable table 20 to produce translatory movement thereof along the X-axis of the scanner in accordance with rotational displacement of the motor 40. The numerical positioning table is suitably of the type manufactured by the Superior Electric Company of Bristol, Connecticut, and sold under the name "Slo-syn."

The tracer 22 is fixedly supported above the movable table 20 on a crosshead 44 which in turn is supported upon the machine base 26 through the intermediary of a support column 46. The tracer 22 the as illustrated in FIG. 4 is of a known type and is adapted to automatically maintain its sensing head in a predetermined orientation or alignment with reference to the line or contour being scanned. Although the tracer illustrated is of the optical type and is automatic in operation, it is to be understood that other types, either manually or automatically controlled, may be employed.

As illustrated in FIG. 4, the tracer 22 comprises a fixed support head 50 provided with a sensor or photocell 52 which is rotatably supported through the intermediary of a ring gear 54 which is drivably connected with a pinion gear 56. The photocell 52 is provided with photosensitive areas which define a front-to-back axis 58 and which produce electrical signals corresponding to the relative position of the axis and the optical image of the line being traced. These electrical signals are suitably applied to a difference circuit 60 which develops an output signal having an amplitude and polarity corresponding to the magnitude and direction of angular displacement of the front-to-back axis 58 from the direction of the line being traced. This signal is applied through an amplifier 62 to a servomotor 64 which is mechanically connected through an output shaft 66 to the pinion gear 56. The servomotor 64 is energized by the amplifier to produce the necessary displacement to maintain the axis 58 of the photocell 52 in alignment with the direction angle of the line or contour being traced. The tracer 22 is suitably of the type manufactured and sold by Stewart-Warner Corporation, designated as Model MMT-111 and which is described in U.S. Pat. No. 3,213,282 granted to F. Brouwer on Oct. 19, 1965 and assigned on its face to the Stewart-Warner Corporation.

The tracer 22 thus includes an output shaft 66 which is maintained in an angular position corresponding to the direction angle of the line or contour being traced. The shaft 66 is connected with the input shaft of a resolver 70 which in the illustrative embodiment is of the inductive type and comprises a rotor which carries an excitation winding 72 and a stator comprising a pair of quadrature related cosine and sine output windings 74 and 76 respectively. The rotor is mechanically coupled to the shaft 66 and thus is angularly displaced in accordance with the direction angle of the line being traced. The excitation winding 72 is connected across a source E of alternating current supply voltage through a potentiometer 75 which permits adjustment of the amplitude of the supply voltage applied across the excitation winding 72. The output winding 74 produces a voltage corresponding to the cosine of the angular position of the rotor and has one terminal connected to ground or a point of reference potential and the other connected to a demodulator 78. The output winding 76 produces a voltage corresponding to the sine of the angular position of the rotor and has one terminal connected to a demodulator 80 and the other terminal connected to the point of reference potential. The resolver 70 may suitably be the type manufactured by the Bendix Corporation and sold under the name "Autosyn" Resolver Type AY–2215–38B.

The demodulators 78 and 80 are adapted to produce a direct current output signal voltage having a magnitude proportional to the amplitude of the input alternating current signal voltage and having a constant polarity regardless of the phase of the input signal. Thus, the demodulators may suitably take the form of a full-wave rectifier. The output signal of demodulator 78 is a DC voltage having a magnitude proportional to the cosine of the direction angle represented by the position of shaft 66. The output signal of the demodulator 78 is applied to the input of a pulse generator 82. The demodulator 80 produces a direct current output signal having a magnitude proportional to the sine of the direction angle represented by the shaft 66 and is applied to the input of a pulse generator 84.

The pulse generators 82 and 84 are each adapted to produce an output pulse train having pulse repetition rates corresponding to the magnitude of the respective input voltages. The pulse generators desirably produce a pulse of substantially rectangular waveform and suitably take the form of a conventional astable or free running multivibrator. Thus, each pulse generator has a first output with the pulses in a reference phase and a second output with the pulses in a quadrature phase, i.e., the first and second pulse output trains are 90° displaced in phase. The pulse generators 82 and 84 are suitably of the type manufactured by the Icon Corporation and sold under the identification of type MV–2 multivibrator.

In order to provide for selective utilization of the output pulse trains of the pulse generators, quadrant switching means are provided. The first output of pulse generator 82 corresponding to the reference phase is connected through switching means in the form of a silicon controlled rectifier (SCR) 86 to the input of a pulse amplifier 100. Similarly, the second output corresponding to the quadrature phase is applied through a switching means in the form of an SCR 88 to the input of the amplifier 100. Selective switching of the pulse generator output is provided by a commutator switch 90 having a first segment 92 connected with the gate electrode of the SCR 86 and a second segment 94 connected with the gate electrode of the SCR 88. The wiper contact 96 of the commutator switch 90 is electrically connected to the positive terminal of a DC supply source V and is mechanically connected to the motor shaft 66 for angular displacement with the rotor of the resolver 70. The pulse generator 84 has its first output corresponding to the reference phase connected through a switching means in the form of an SCR 104 to the input of a pulse amplifier 102. Similarly, the pulse generator 84 has its second output corresponding to the quadrature phase connected to the input of amplifier 102 through a switching means in the form of an SCR 106. Selective switching of the outputs of the pulse generator 84 is provided by a commutator switch 108 and having a commutator segment 110 connected with the gate electrode of the SCR 104 and having a segment 112 connected with the gate electrode of the SCR 106. The wiper contact 114 is electrically connected to the positive terminal of the voltage source V and is mechanically connected to the shaft 66 for displacement with the rotor of resolver 70.

The selectively switched output pulses of the pulse generator 82 are amplified in the pulse amplifier 100 and then supplied to the pulse stepping motor 40. Similarly, the selectively switched pulses from the pulse generator 84 are amplified by the pulse amplifier 102 and then applied to the pulse stepping motor 36. The pulse amplifiers 100 and 102 may be of conventional design and are suitably of the type manufactured by Control Systems Research, Inc. and sold under the designation Model RP300C.

The pulse stepping motor 40, as previously referred to in connection with FIG. 3, is connected with the lead screw 42 and displaces the movable table 20 along the X-axis of the scanner. Similarly, the pulse stepping motor 36 is connected with the lead screw 38 and displaces the movable table 20 along the Y-axis of the scanner. The pulse stepping motors 36 and 40 are of a conventional type which are adapted to produce angular shaft displacement in a stepwise fashion with a displacement of a fixed angular increment corresponding to each input pulse applied to the motor. The stepping motors 36 and 40 are bidirectional and produce a shaft rotation in the forward direction, i.e., corresponding to the positive direction along the respective coordinate axes in response to input pulses of the reference phase and produce a rotation in the reverse direction, i.e., in the negative direction along the corresponding coordinate axis in response to input pulses of the quadrature phase. Such motors are suitably of the type sold by Control Research Systems, Inc. and designated as type 0800 pulse motors.

The selected output pulse trains of the pulse generators 82 and 84 are applied to respective inputs of a computer 116 and thence to a recorder 118. If desired, the computer 116 may be deleted from the system and the pulse trains from the pulse generators 82 and 84 may be applied to the inputs of the recorder 118 which in such instance may be a two-channel magnetic tape recorder of conventional design. The computer 116, if included in the system, is adapted to accept the digitized data representing the positional coordinates of the line or contour being scanned and to add, by means of a self-contained program, auxiliary data thereto such as data codes, cutting speeds, feed rates and cutter center offset, etc., as may be desired for the program to be used with a numerically controlled machine tool. This aspect of the program preparation forms no part of the present invention and is well known to those skilled in the art. A computer suitable for use in connection with the system, as described herein is manufactured by Scientific Data Systems and identified as Model 920. The selected pulse trains of the pulse generators 82 and 84 respectively may, if desired, be applied to respective pulse counters 120 and 122 which are suitably connected to the outputs of the pulse amplifiers 100 and 102 respectively. The counters 120 and 122 are adapted to produce a cumulative net count of the pulses in the pulse trains which represent the digitized positional coordinate information for the X- and Y-axes respectively. The counters 120 and 122 display the net count, which thus represents the instantaneous values of the positional coordinates on the line being scanned.

In operation of the system just described, a workpiece model 24 is positioned on the movable table 20 in a predetermined orientation with reference to the X- and Y-coordinate axes of the scanner. With the table positioned so that the tracer 22 is at a desired starting point on the model 24 and with the system appropriately energized the tracer photocell 52 will produce a signal which, through the difference circuit 60, amplifier 62 and servomotor 64, will orient itself so that the front-to-back axis 58 is aligned with the line on the model to be scanned. This causes the shaft 66 to be displaced in accordance with the direction angle of the line being traced and the rotor of the resolver 70 is correspondingly displaced.

Accordingly, the cosine winding 74 of the resolver produces a signal corresponding to the X-axis component of the direction angle which is rectified in the demodulator 78, the output of which is applied to the pulse generator 82 which generates pulses having a pulse repetition rate corresponding to the magnitude of the applied voltage. The pulse generator 82 has a first output pulse train of the reference phase which may be applied through the SCR 86 to the pulse amplifier 100 and has a second output pulse train of quadrature phase which may be applied through the SCR 88 to the input of the pulse amplifier 100. One or the other of the pulse trains is selected by quadrant switching means depending upon the quadrant of the rectangular coordinate system in which the direction angle of the line is located. In commutator switch 90 the wiper contact 96 is mechanically coupled with the rotor of resolver 70 so that it engages the commutator segment 92 when the direction angle falls in the first and fourth quadrants of the coordinate system and so that it contacts the segment 94 when the direction angle falls in the second and third quadrants. Thus, it is seen that in the first and fourth quadrants the positive voltage from the source V is applied to the gate electrode of the SCR 86 and the pulse train of the reference phase corresponding to the positive direction on the X-axis is applied to the pulse amplifier 100 and pulse stepping motor 40 as well as the input of the computer 116. When the direction angle falls in the second or third quadrant of the coordinate reference system, the positive voltage from the source V is applied to the gate electrode of the SCR 88 and thus the pulse train of quadrature phase corresponding to the negative direction on the X-axis is applied through the pulse amplifier 100 to the pulse stepping motor 40 and is also applied to the input of the computer 116.

At the same time the sine winding 76 of the resolver 70 develops an alternating signal voltage having an amplitude corresponding to the sine or Y-axis component of the direction angle. This signal is applied to the demodulator 80 which develops a direct voltage having a magnitude corresponding thereto which in turn is applied to the pulse generator 84. Pulse generator 84 generates pulses having a pulse repetition frequency corresponding to the input voltage and, hence, to the sine or Y-axis component of the direction angle. Quadrant switching means for the Y-axis signal includes the commutator switch 108 and the SCRs 104 and 106. The wiper contact 114 of the commutator 108 is mechanically coupled with the shaft of the resolver 70 so that it contacts the segment 110 when the direction angle falls in the first and second quadrants and it contacts the segment 112 when the direction angle falls in the third and fourth quadrants. Thus, it is seen that a positive voltage of the source V is applied to the gate electrode of the SCR 104 for a direction angle in the first and second quadrants which corresponds to the positive direction along the Y-axis. Therefore, pulses of the reference phase from the pulse generator 84 are applied through the SCR 104 to the pulse amplifier 102 and thence the pulse stepping motor 36 and also to the input of computer 116 when the direction angle lies in the first or second quadrants. When the direction angle falls in the third and fourth quadrants in the coordinate system, pulses of the quadrature phase from the pulse generator 84 are applied through the pulse amplifier 102 to the stepping motor 36 and also to the computer 116.

Thus, in operation with the initial direction angle established by the tracer 22, the stepping motors 40 and 36 corresponding to the X-axis and Y-axis respectively will be simultaneously energized with pulse trains having a pulse repetition rate corresponding to the cosine and sine components of the direction angle and with a phase corresponding to the quadrant of the direction angle. Since the motors 36 and 40 are displaced one increment of rotation for each applied pulse, the relative speeds of the motors depend upon the relative pulse repetition rates. If, for example, the direction angle of the line at the starting point is 45° and, therefore, falls in the first quadrant, it will be appreciated that the signal voltages produced by the cosine winding 74 and the sine winding 76 of the resolver 70 are equal and accordingly the pulse generators 82 and 84 will produce equal pulse repetition rates. With the direction angle in the first quadrant, SCR 86 will be conductive and pulses of the reference phase will be applied by pulse generator 82 to the stepping motor 40. Similarly, the SCR 104 will be conductive and pulses of the reference phase from the pulse generator 84 will be applied to the stepping motor 36. This simultaneous energization of the stepping motors 40 and 36 will cause the respective lead screws 42 and 38 to be rotated at the same rate and the relative movement in the scanner, i.e., between the table 20 and the tracer 22 will be in the direction of 45°. If the direction angle should change to a value between 0° and 45°, the signal produced by the cosine winding 74 will increase and the signal produced by the sine winding 76 will decrease. Thus, the pulse repetition rate of the pulse generator 82 will increase and the pulse repetition rate of the pulse generator 84 will decrease so that the speed of stepping motor 40 is greater than that of the stepping motor 36 and the relative displacement in the scanner changes accordingly. In case the direction angle is 0°, i.e., along the X-axis, the pulse repetition rate of pulse generator 82 will be a maximum value and the pulse repetition rate of pulse generator 84 will be 0 and, accordingly, the pulse motor 40 will be running at maximum speed and pulse motor 36 will be at a standstill so that the table is moved along the X-axis only. It will now be appreciated that similar relationships will be obtained when the direction angle lies between 45° and 90° and that an analogous relationship holds for each of the other quadrants in the rectangular coordinate system.

Although the direction of relative displacement in the scanner is determined by the relative values of pulse repetition rates from the pulse generators 82 and 84 and, hence, the relative speeds of pulse motors 40 and 36, the maximum speed is determined by the frequency range or maximum pulse repetition rate of the pulse generators 82 and 84 and the range of input voltage applied thereto. The pulse generators 82 and 84 may, for example, have a pulse repetition rate capability or frequency range from 0 pulses per second up to 8,000 pulses per second, it being noted that this range determines the degree of resolution of the positional coordinates in digital form. The voltage applied to the input of the pulse generator may be adjusted to determine the maximum pulse repetition rate and the maximum speed by the potentiometer 75 which establishes the excitation voltage applied across the rotor winding 72 of the resolver 70.

These relationships are depicted in FIG. 5 in which the first quadrant of the X-Y coordinate system is represented. The vector S has a magnitude corresponding to the adjusted speed of movement of the scanner or table 20. The maximum value of table speed is represented by the dashed line M, which is determined by the maximum pulse repetition rate available from the pulse generators 82 and 84. The vector S has a direction angle A corresponding to the direction angle of the line being traced, and it is noteworthy that for a given speed setting the speed remains constant for all values of direction angle, as indicated in FIG. 5. For a given direction angle, as illustrated, the pulse repetition rate and, hence, the velocity along the X-axis has a value $a$, and the pulse repetition rate and the velocity along the Y-axis has a value $b$.

It will now be apparent to those skilled in the art that this invention may be applied to any two or all axes of a multiaxis system. For example, if used with a three-dimension, six-axis system it is possible to obtain the tangent angle on a surface or line at any point in space. By combining the signals corresponding to two sets of axes in a differential and resolving between the two, a signal corresponding to the angle of the first and the angle of the second will establish a tangent angle. Thus, when this signal is fed into a third pulse generator it controls or represents the position of that axis.

It is to be understood that the system just described may be implemented in different ways and that the components referred to are exemplary only. Functional equivalents of the various components may be employed if desired. For example, instead of the inductive resolver 70 a sine-cosine potentiometer utilizing DC voltage may be employed. Additionally, a resolver in the form of a linear differential transformer may be employed.

While the invention has been described with respect to an illustrative embodiment thereof, it is not to be construed in a limiting sense. Many variations and modifications will now occur to those skilled in the art. For a definition of the invention, reference is made to the appended claims.

The embodiments of the invention in which an exclusive property or privilege is claimed are defined as follows:

1. A digitizing system for producing a digital representation of a line in a rectangular coordinate system having X- and Y-axes, said system comprising; a resolver adapted to receive an angular input signal and to develop first and second output signals corresponding respectively to the cosine and sine of the angular input signal, a tracer connected with the resolver for supplying a direction angle input signal thereto corresponding to the direction angle between adjacent points on the line, an X-axis pulse generator connected with the cosine output of said resolver and adapted to produce output pulses having a pulse repetition rate corresponding thereto, a Y-axis pulse generator connected with the sine output of said resolver and adapted to produce output pulses having a pulse repetition rate corresponding thereto, an X-axis pulse stepping motor connected with the X-axis pulse generator and responsive to the output pulses thereof to produce relative displacement of the tracer and the line corresponding to the number of pulses generated thereby, a Y-axis pulse stepping motor connected with the Y-axis pulse generator and responsive to the output pulses thereof to produce relative displacement of the tracer and the line corresponding to the number of pulses generated thereby, said X-axis and Y-axis pulse stepping motors being connected to produce said relative displacement in accordance with said direction angle whereby the positional coordinates of successive points are represented by the number of pulses produced by the X-axis and Y-axis pulse generators corresponding thereto, a quadrant-switching means connected between said resolver and said pulse generators and adapted to selectively switch the output of each pulse generator between a reference phase and a quadrature phase in accordance with the quadrant of said direction angle whereby said pulse stepping motors are rotated in a forward direction in response to pulses of the reference phase and are rotated in a reverse direction in response to pulses of the quadrature phase, and whereby the accuracy of such digitized positional coordinates is verified by the displacement of the tracer to said successive points.

2. The invention as defined in claim 1 wherein recording means is connected to the outputs of said pulse generators and is adapted to produce a separate record of the output pulses from the X-axis pulse generator and the output pulses of the Y-axis pulse generator.

3. A system for use in generating digital data for use in controlling numerically controlled machine tools and comprising: support means adapted to receive an object with a line representing the contour of a workpiece, tracing means having a direction indicating member adapted to be aligned with the direction angle of said line at any point thereon, first and second pulse stepping motors for displacing one of said means along respective first and second axes, a sine-cosine resolver having its input operatively connected with the indicating member and adapted to produce first and second output signal quantities corresponding respectively to the sine and cosine of said direction angle, first and second pulse generators operatively connected with said resolver and responsive to the respective output signal quantities to produce output pulses having a pulse repetition rate corresponding thereto, said first and second pulse generators being connected respectively with said first and second pulse stepping motors for controlling energization thereof, a quadrant-switching means connected between said resolver and said pulse generators and adapted to selectively switch the output of each pulse generator between a reference phase and a quadrature phase in accordance with the quadrant of said direction angle whereby said pulse stepping motors are rotated in a forward direction in response to pulses of the reference phase and are rotated in a reverse direction in response to pulses of the quadrature phase, whereby said one of said means is displaced along each axis a distance corresponding to the number of pulses and at a rate corresponding to the repetition frequency of the respective pulse generator so that said indicating member is maintained in alignment with the direction angle of the line.

4. The invention as defined in claim 3 wherein recording means is connected to the outputs of said pulse generators and is adapted to produce a separate record of the output pulses of the first pulse generator and the output pulses of the second pulse generator.

* * * * *